(12) United States Patent
Zheng et al.

(10) Patent No.: US 11,892,736 B2
(45) Date of Patent: Feb. 6, 2024

(54) ARRAY SUBSTRATE AND DISPLAY PANEL

(71) Applicant: HKC CORPORATION LIMITED, Shenzhen (CN)

(72) Inventors: Xinglong Zheng, Shenzhen (CN); Jiheng Feng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/075,279

(22) Filed: Dec. 5, 2022

(65) Prior Publication Data
US 2023/0229046 A1  Jul. 20, 2023

(30) Foreign Application Priority Data
Jan. 18, 2022  (CN) .......................... 202210051441.9

(51) Int. Cl.
*G02F 1/1362* (2006.01)

(52) U.S. Cl.
CPC .. *G02F 1/136286* (2013.01); *G02F 1/136222* (2021.01)

(58) Field of Classification Search
CPC .................................................. G02F 1/1362
See application file for complete search history.

(56) References Cited

U.S. PATENT DOCUMENTS

| | | | |
|---|---|---|---|
| 6,188,459 B1 * | 2/2001 | Kim ................. | G02F 1/134363 349/141 |
| 2006/0139544 A1 * | 6/2006 | Ko .................... | G02F 1/134363 349/141 |
| 2008/0100764 A1 * | 5/2008 | Haruyama ........ | G02F 1/134363 349/43 |
| 2011/0199568 A1 * | 8/2011 | Morishita ......... | G02F 1/134363 349/141 |
| 2012/0181557 A1 | 7/2012 | Kim et al. | |

FOREIGN PATENT DOCUMENTS

| | | |
|---|---|---|
| CN | 1434338 A | 8/2003 |
| CN | 102187270 A | 9/2011 |
| CN | 103163693 A | 6/2013 |

(Continued)

OTHER PUBLICATIONS

Huang, Yaming, the ISA written comments, dated Feb. 2023, CN.
Huang, Yaming, the International Search Report, dated Feb. 2023, CN.

*Primary Examiner* — Sang V Nguyen (57) ABSTRACT

An array substrate and a display panel are disclosed. A common electrode layer on the array substrate includes a common electrode trunk and multiple common electrode branches. A pixel electrode layer includes multiple interconnected pixel electrode branches, each of which includes a branch body and a branch end connected therewith. The branch end includes a first side opposite to the common electrode trunk to form a first gap, and a second side and a third side respectively disposed opposite to the corresponding common electrode branches to form a second gap and a third gap. A fourth gap is formed between the branch body and the common electrode branch. Of the first, the second and the third gaps, the width value corresponding to at least one gap is smaller than the width of the fourth gap.

18 Claims, 6 Drawing Sheets

(56) References Cited

FOREIGN PATENT DOCUMENTS

| | | |
|---|---|---|
| CN | 104375341 A | 2/2015 |
| CN | 104820322 A | 8/2015 |
| CN | 109557731 A | 4/2019 |
| CN | 114063355 A | 2/2022 |
| JP | 2000056320 A | 2/2000 |
| JP | 2000330123 A | 11/2000 |
| KR | 20080002205 A | 1/2008 |

* cited by examiner

ARRAY SUBSTRATE AND DISPLAY PANEL

CROSS-REFERENCE TO RELATED APPLICATIONS

This application claims the priority and benefit of Chinese patent application 202210051441.9, titled "Array Substrate and Display Panel" and filed Jan. 18, 2022, with China National Intellectual Property Administration, the entire contents of which are incorporated herein by reference.

TECHNICAL FIELD

This application relates to the field of display technology, and more particularly relates to an array substrate and a display panel.

BACKGROUND

The description provided in this section is intended for the mere purpose of providing background information related to the present application but doesn't necessarily constitute prior art.

With the development of display technology, the display mode of the display panel is also constantly changing, from the previous twisted nematic (TN) mode to the in-plane switching (IPS) mode, which overcomes the poor view caused by the refractive index anisotropy of the liquid crystal in the TN mode.

Dot-like spots (Trace Mura) may occur in the current IPS display mode, that is, after the end of the previous frame, the liquid crystal molecules cannot be rotated to the required rotational state for the current frame in time, resulting in the image sticking phenomenon. Especially at the pixel edge of the sub-pixel along the direction of the gate line, since the electric field component in the horizontal direction formed between the common electrode and the pixel electrode is weaker than that in the middle portion of the pixel, while the electric field component in the vertical direction is stronger than that in the middle portion of the pixel, the Trace Mura phenomenon is more likely to occur.

SUMMARY

It is therefore a purpose of the present application to provide an array substrate and a display panel, which can reduce the possibility of occurrence of Trace Mura at the pixel edge position and improve the penetration rate or transmittance at the pixel edge position.

The present application discloses an array substrate, including a plurality of data lines, a plurality of scan lines, and a plurality of pixels, where the plurality of pixels are respectively driven by the corresponding scan lines and the data lines, and each of the pixels includes a pixel electrode layer and a common electrode layer. The common electrode layer includes a plurality of common electrode branches and a common electrode trunk connected to the plurality of common electrode branches. The pixel electrode layer includes a plurality of interconnected pixel electrode branches. The plurality of pixel electrode branches and the plurality of common electrode branches are alternately arranged. Each pixel electrode branch includes a branch body and a branch end connected with the branch body, where the branch end is arranged at one end of the branch body adjacent to the common electrode trunk. The branch end includes a first side, a second side and a third side, where the first side is disposed opposite the common electrode trunk to form a first gap, and where the second side and the third side are respectively disposed opposite to the common electrode branches on both sides of the pixel electrode branch to respectively form a second gap and a third gap. A fourth gap is formed between the branch body and the common electrode branch. Of the first gap, the second gap and the third gap, the width value corresponding to at least one gap is smaller than the width of the fourth gap.

Optionally, the width of the first gap is smaller than the width of the fourth gap, let the width of the first gap be d1, the width of the fourth gap be w, then the ratio of d1 to w lies between 0.25 and 0.65, namely $0.25 \le d1/w \le 0.65$.

Optionally, the widths of the second gap and the third gap are equal, and the width of the second gap is smaller than the width of the fourth gap. Let the width of the second gap and the third gap be d1, and the width of the fourth gap be w, then the ratio of d1 to w lies between 0.25 and 0.65, that is, $0.25 \le d1/w \le 0.65$.

Optionally, a first transition gap is formed from the junction of the common electrode trunk and each common electrode branch to the end of the pixel electrode branch adjacent to the common electrode trunk, where let the width of the first transition gap be X1, then $w > X1 \ge d1$.

Optionally, each pixel electrode branch includes a first sub-branch and a second sub-branch, where the first sub-branch is connected to the branch end through the second sub-branch. A fourth gap is formed between the first sub-branch and the adjacent common electrode branch, and a second transition gap is formed between the second sub-branch and the adjacent common electrode.

Let the width of the fourth gap be w, the width of the first gap be d1, and the width of the second transition gap be X2, then $d1 \le X2 < w$.

The value range of the width of the first gap lies in the range of 1 um to 2.5 um, that is, $1\ \text{um} \le d1 \le 2.5\ \text{um}$.

The value range of the width of the fourth gap lies in the range of 3.8 um to 4 um, that is, $3.8\ \text{um} \le w \le 4\ \text{um}$.

Optionally, let the width of the first sub-branch be s1, the width of the second sub-branch be s2, the width of the branch end be w1, the length of the branch end be L1, and the length of the second sub-branch be L2.

Then $1.8\ \text{um} \le s1 \le 2\ \text{um}$, $2\ \text{um} \le s2 \le 2.5\ \text{um}$, $2.5\ \text{um} \le w1 \le 3.5\ \text{um}$, $2.5\ \text{um} \le L1 \le 4\ \text{um}$, $4\ \text{um} \le L2 \le 8\ \text{um}$.

Optionally, the branch end is a polygon, and the junction of the common electrode trunk and the common electrode branch is an arc-shaped chamfer.

Optionally, the branch end is arc-shaped, and the junction of the common electrode trunk and the common electrode branch is an arc-shaped chamfer. The arc-shaped chamfer and the arc-shaped edge of the common electrode trunk adjacent to the branch end form an arc-shaped structure.

Optionally, the pixel electrode layer further includes a pixel electrode trunk, and the plurality of pixel electrode branches are connected to the pixel electrode trunk. The common electrode branch includes a common electrode branch body and a common electrode branch end connected with the common electrode branch body. The common electrode branch end is arranged at one end of the common electrode branch main body adjacent to the respective pixel electrode trunk. The first gap, the second gap and the third gap are respectively formed between the common electrode branch end with the pixel electrode trunk and the corresponding pixel electrode branches. The fourth gap is formed between the common electrode branch body and the corresponding pixel electrode branch.

The present application further discloses a display panel, including a color filter substrate and any one of the array substrates described above, wherein the color filter substrate and the array substrate are aligned and bonded together to form a cell.

Compared with the solution that does not change the end of the pixel electrode branch, the present application reduces the gap between the branch end of the pixel electrode branch and the common electrode by changing the branch end of the pixel electrode branch, thereby enhancing the electric field strength between the branch end of the pixel electrode branch and the common electrode, reducing the electric field interference formed from the data line and the scan line to the branch end of the pixel electrode branch or to the common electrode, and reducing the ratio of the vertical electric field influence. Furthermore, the pixel electrode does not affect the penetration rate, which is beneficial to improve the penetration rate of the pixel edge position while reducing the possibility of occurrence of Trace Mura at the pixel edge position.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

For a better understanding of the purposes, technical solutions and advantages of the embodiments of the present disclosure, the technical solutions embodied in the embodiments of the present disclosure will be described in a definite and comprehensive manner below with reference to the accompanying drawings used in the embodiments of the present disclosure. Apparently, the described embodiments are merely some embodiments of the present disclosure, but not all embodiments.

The present application will be described in detail below with reference to the accompanying drawings and optional embodiments.

Figure 1:
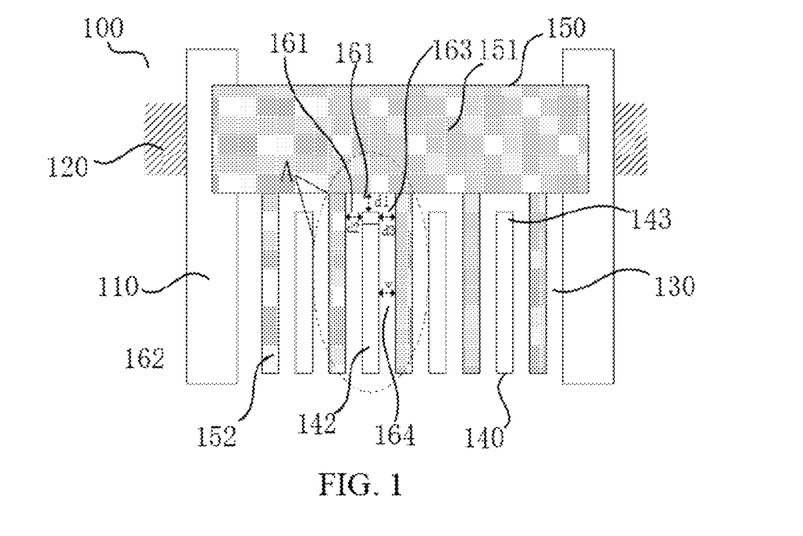
FIG. 1 is a schematic diagram of an array substrate according to a first embodiment of the present application.
Figure 2:
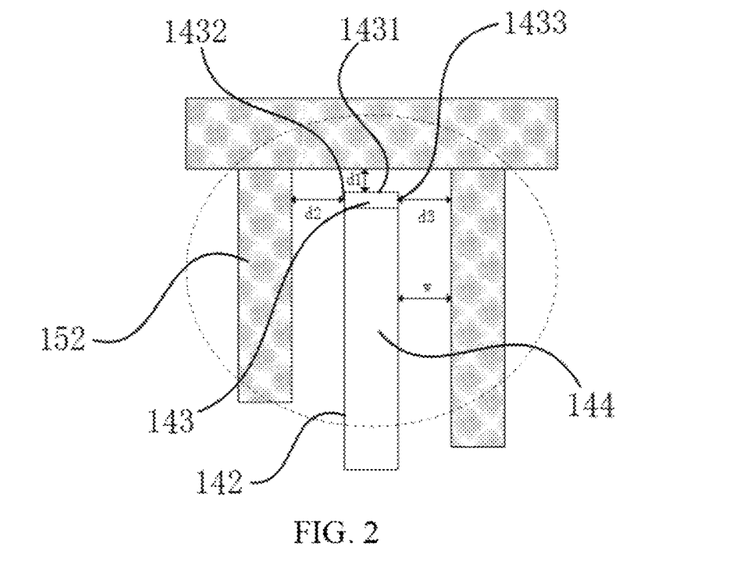
FIG. 2 is an enlarged schematic view of a branch end of the first embodiment of the present application.

FIG. 1 is a schematic diagram of an array substrate according to a first embodiment of the present application. FIG. 2 is an enlarged schematic view of the branch end of the first embodiment of the present application. As shown in FIG. 1 and FIG. 2, as a first embodiment of the present application, an array substrate 100 is disclosed, which includes a plurality of data lines 110, a plurality of scan lines 120 and a plurality of pixels 130, where the plurality of pixels 130 are driven by the corresponding scan lines 120 and data lines 110, and where each of the pixels 130 includes a pixel electrode layer 140 and a common electrode layer 150. The common electrode layer 150 includes a common electrode trunk 152 and a plurality of common electrode branches 152, where the plurality of the common electrode branches 152 are connected to the common electrode trunk 151 and are arranged parallel to each other. The pixel electrode layer 140 includes a plurality of pixel electrode branches 142 connected to each other, and the plurality of the pixel electrode branches 142 are arranged in parallel with each other. The plurality of the pixel electrode branches 142 and the plurality of the common electrode branches 152 are alternately arranged, and each pixel electrode branch 142 includes a branch body 144 and a branch end 143 connected to the branch body 144, and the branch end 143 is disposed at one end of the branch body 144 adjacent to the common electrode trunk 151. The branch end 143 includes a first side 1431, a second side 1432 and a third side 1433, where the first side 1431 is the side of the branch end 143 closest to the common electrode trunk 151, and the other second side 1432 and third side 1433 are respectively located on both sides of the first side 1431. The first side 1431 is disposed opposite to the common electrode trunk 151 to form a first gap 161, and the second side 1432 and the third side 1433 are respectively connected to the common electrode branches 152 on both sides of the pixel electrode branch 142 to form a second gap 162 and a third gap 163, respectively. A fourth gap 164 is formed between the branch body 144 and the common electrode branch 152. Of the first gap 161, the second gap 162 and the third gap 163, the width value corresponding to at least one gap is smaller than the width of the fourth gap 164.

Compared with the related art in which the horizontal electric field at the branch end 143 is greatly affected by the scan line and the data line, and so the obvious Trace Mura problem occurs, the present application reduces the gap from the branch end 143 to the common electrode trunk 151 and/or the common electrode branch 152, so that the electric field strength between the branch end 143 and the common electrode trunk 151 or the pixel electrode branch is increased, reducing the influence of scan lines and data lines, so that the electric field strength of the final electric field between the branch end 143 and the common electrode trunk 151 and/or the common electrode branch 152 is enhanced as a whole, and the horizontal electric field strength is increased thereby increasing the proportion of the horizontal electric field to a certain extent, so as to ensure that the liquid crystal of the display panel can be driven by enough horizontal electric field to display normally and alleviate the Trace Mura problem. For example, in the absence of the influence of data lines and scan lines, assuming that the electric field formed between the branch end and the common electrode trunk 151 and/or the common electrode branch 152 has an electric field components ratio of 8:2 in the horizontal direction and the vertical direction. However, due to the great influence of the data lines and scan lines, the final electric field formed between the branch end 143 and the common electrode trunk 151 and/or the common electrode branch 152 is greatly disturbed, and the ratio of the final electric field components in the horizontal and vertical directions may become 5.5:4.5. After adopting the solution of the present application, since the gap between the branch end 143 and the common electrode trunk is reduced, the electric field strength between the branch end 143 and the common electrode trunk 151 and/or the common electrode branch 152 increases. The ratio of the electric field components in the horizontal direction and the vertical direction of the electric field formed between the electrode trunk 151 and/or the common electrode branch 152 will be slightly reduced, and may become 7:3. However, at this time, since the data lines and scan lines are unchanged, the influence of the electric fields of the data lines and scan lines is also unchanged. However, since the electric field strength between the branch end 143 and the common electrode trunk 151 and/or the common electrode branch 152 is increased after the solution of the present application is adopted, even if it is affected by the data line and the scan line, the influence of the interference on the final electric field formed between the branch end 143 and the common electrode trunk 151 and/or the common electrode branch 152 is weakened, and the electric field components of the final electric field in the horizontal and vertical directions may become 6:4. That is to say, the intensity of the horizontal electric field component of the final electric field is enhanced, and the proportion of the horizontal electric field component can also be increased to a certain extent, which is beneficial to reduce the interference of the data lines and scan lines to the electric field formed by the pixel electrode and the common electrode, and is beneficial to control the morphology of liquid crystal macromolecules at the position of the branch end 143, thereby reducing the possibility of occurrence of Trace Mura.

Further, since the field strength formed by the first side and the common electrode trunk has a relatively large influence on the entire end, the width of the first gap may be reduced, and the width of the first gap 161 is smaller than the width of the fourth gap 164. By extending the end of the original pixel electrode branch 142 closer to the common electrode trunk 151 or extending the original common electrode trunk 151 close to the end of the pixel electrode branch 142, the gap of the first gap 161 is smaller than the original gap of the first gap formed when the pixel electrode branch and the common electrode trunk are not changed and is smaller than the width of the fourth gap 164, which enhances the electric field strength of the first gap.

In some embodiments, the width of the first gap 161 is d1, the width of the second gap 162 is d2, the width of the third gap is d3, the width of the fourth gap 164 is w, then the ratio of d1 to w is between 0.25 and 0.65, i.e. $0.25 \le d1/w \le 0.65$. If the ratio is less than 0.25, the improvement of Trace Mura problem is not obvious. However, if it exceeds 0.65, the difference between the two is too large, then the field strength formed at the main branch 144 and the end branch 143 of the pixel electrode branch 142 is too different, which may bring about brightness difference problems. In some embodiments, the value range of the width d1 of the first gap 161 is 1 um to 2.5 um, that is, $1\ um \le d1 \le 2.5\ um$, and in some embodiments 1.3 um may be set as the standard parameter during preparation during the preparation process. The value range of the width of the fourth gap is 3.8 um to 4 um, that is, $3.8\ um \le w \le 4\ um$, and 4 um may be set as a standard parameter during preparation during the preparation process.

In this embodiment, the width d2 of the second gap 162 and the width d3 of the third gap 163 may be the same as the width w of the fourth gap 164. In this embodiment, the width d2 of the second gap 162 and the width d3 of the third gap 163 are not changed.

Figure 3:
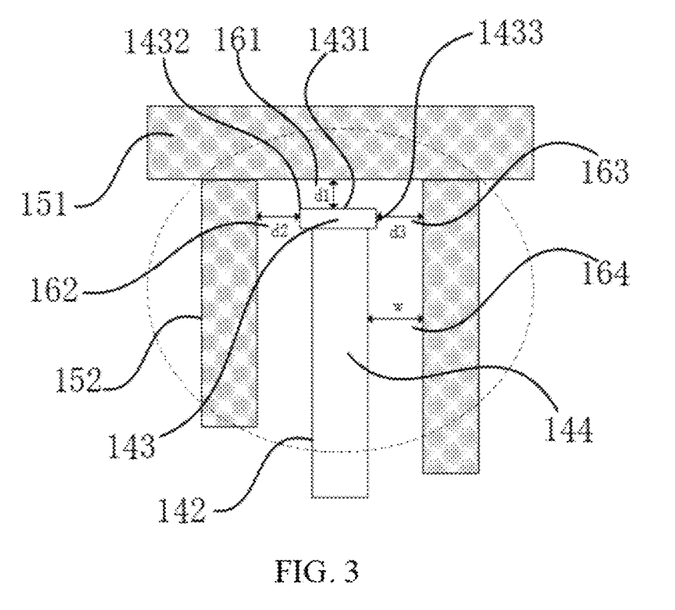
FIG. 3 is an enlarged schematic view of a branch end of a second embodiment of the present application.

FIG. 3 is an enlarged schematic view of a branch end of the second embodiment of the present application. As the second embodiment of the present application, the difference from the first embodiment is that the width d2 of the second gap 162 and the width d3 of the third gap 163 are equal, and the width d2 of the second gap is smaller than the width w of the fourth gap. The width of the first gap d1 is not changed, that is, no change is made to the first side 1431 of the end, and the electric field strength of the branch end 143 is changed by changing the widths of the gaps at the second side 1432 and the third side 1433, and in some embodiments by directly extending the second side 1432 or the third side 1433 to the corresponding common electrode branches 152, or by extending the corresponding common electrode branches 152 to the second side 1432 and the third side 1433 of the branch end 143, thereby reducing the original gap width and increasing the strength of the electric field formed by the second side 1432 and the third side 1433 with the corresponding common electrode branches 152.

Of course, the gaps at the second side 1432 and the third side 1432 do not have to be equal, that is, d3 may not be equal to d2, as long as the width of the gap on one side is less than the width w of the fourth gap 164. By changing the gap on one side of the branch end 143, the overall field strength of the branch end 143 can also be enhanced to a certain extent, which also has a certain effect on the improvement of the Trace Mura problem at the branch end 143.

As the second embodiment of the present application, it can not only be different from the first embodiment of the present application as two different implementations, but also can be combined into one solution, that is, the first gap 161, the second gap 162 and the third gap 163 can all be are smaller than the width of the fourth gap 164, then the field strength on the three sides of the branch end 143 is enhanced, which is more conducive to improving the overall field strength of the branch end. Of course, the widths of the first gap 161, the second gap 162 and the third gap 163 may be equal or unequal, which may be selected and optimized depending on the actual manufacturing process.

Figure 4:
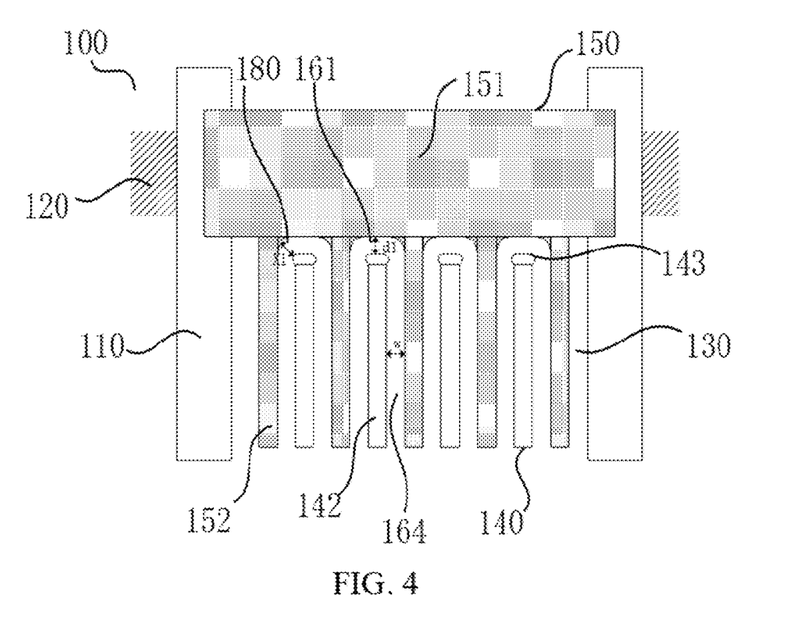
FIG. 4 is a schematic diagram of an array substrate according to a third embodiment of the present application.

FIG. 4 is a schematic diagram of an array substrate according to a third embodiment of the present application. As the third embodiment of the present application, it is a further refinement and improvement of the above-mentioned first embodiment or second embodiment. A first transition gap 180 is formed from the junction of the common electrode trunk 151 and the common electrode branch 152 to the end of the pixel electrode branch 142 adjacent to the common electrode trunk 152, where let the width of the first transition gap 180 be X1, then $w > X1 \ge d1$. Considering that the gap from junction of the common electrode trunk 151 and the common electrode branch 152 to the end of the pixel electrode branch 142 adjacent to the common electrode trunk 151 may be larger than the gap at other places, the shape of the branch end 143 and the shape of the junction of the common electrode trunk 151 and the common electrode branch 152 are changed making the gap between them smaller than the gap before the change, where the width of the gap created here is also smaller than the original, avoiding that the width of the junction is larger than the width of the fourth gap 164 resulting in excessive difference in the electric field around the branch end 143 thereby affecting the uniformity of the electric field. Therefore, the gap from the junction of the common electrode trunk 151 and the common electrode branch 152 to the end of the pixel electrode branch 142 adjacent to the common electrode trunk 151 is further narrowed to form a first transition gap 180. The width of the first transition gap 180 is larger than the width of the first gap 161 and smaller than the width of the fourth gap 164 to form a transition section, so that the electric field formed by the pixel electrode branch 142 and the common electrode branch 152 changes uniformly from the middle to the ends, and increases sequentially.

As the fourth embodiment of the present application, it is a further improvement and refinement on the basis of the above-mentioned embodiments, and provides two different embodiments in which the shape of the branch end 143 is a polygon or the shape of the branch end 143 is a polygon, respectively, so that the penetration rate (Tr) can be increased by 23.3% and 26.16% respectively when the branch end is under the condition of (20 um range) 95% Vop. Furthermore, the ratio of the vertical electric field component ($\Delta Ez$) at the overlapping position of the branch end and the gate line in the top view to the total electric field |E| is reduced from the original 29.56% to 25.95% and 28.69%. Specific examples are described below.

Figure 5:
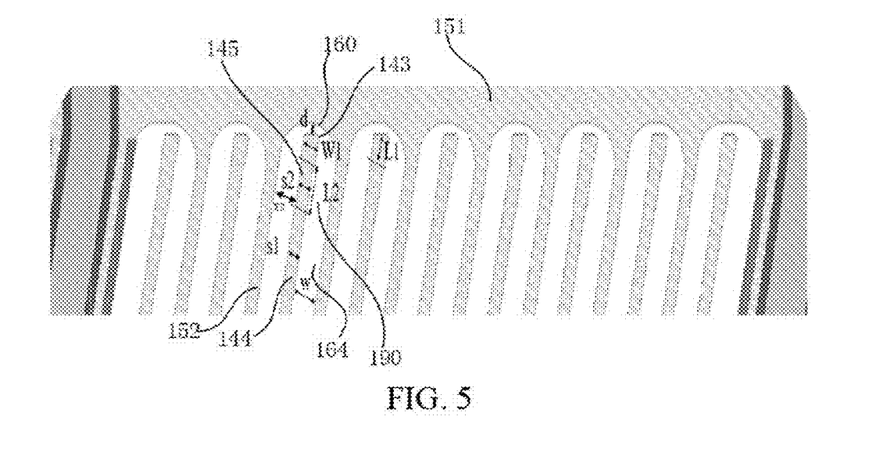
FIG. 5 is a schematic diagram of a fourth embodiment of the present application where the branch end is polygonal.

Referring to FIG. 5, the branch end 143 is a polygon, the junction of the common electrode trunk 151 and the common electrode branch 152 is an arc-shaped chamfer, and the distances from each edge of the branch end 143 to the corresponding edge of the nearest common electrode branch are the same, so as to avoid that the gaps from the various portions of the branch end 143 to the corresponding common electrode branch 153 are too different, resulting in low uniformity of the formed electric field, affecting the distribution of horizontal and vertical electric fields.

Specifically, the branch body 144 includes a first sub-branch 145 and a second sub-branch 146. The first sub-branch 145 is connected to the branch end 143 through the second sub-branch 146. A fourth gap 164 is formed between the first sub-branch 145 and the common electrode branch 152, and a second transition gap 190 is formed between the second sub-branch 146 and the common electrode branch 152. The width of the fourth gap 164 is w, the width of the first gap 161 is d1, and the width of the second transition gap 190 is X2, where $d1 \leq X2 < w$. The width of the first sub-branch 145 is s1, the width of the second sub-branch 146 is s2, the width of the branch end 143 is w1, the length of the branch end 143 is L1, and the length of the second sub-branch is L2.

Then, $1.8 \text{ um} \leq s1 \leq 2 \text{ um}$, $2 \text{ um} \leq s2 \leq 2.5 \text{ um}$, $2.5 \text{ um} \leq w1 \leq 3.5 \text{ um}$, $2.5 \text{ um} \leq L1 \leq 4 \text{ um}$, $4 \text{ um} \leq L2 \leq 8 \text{ um}$, $1 \text{ um} \leq d1 \leq 2.5 \text{ um}$, $3.8 \text{ um} \leq w \leq 4 \text{ um}$.

Figure 6:
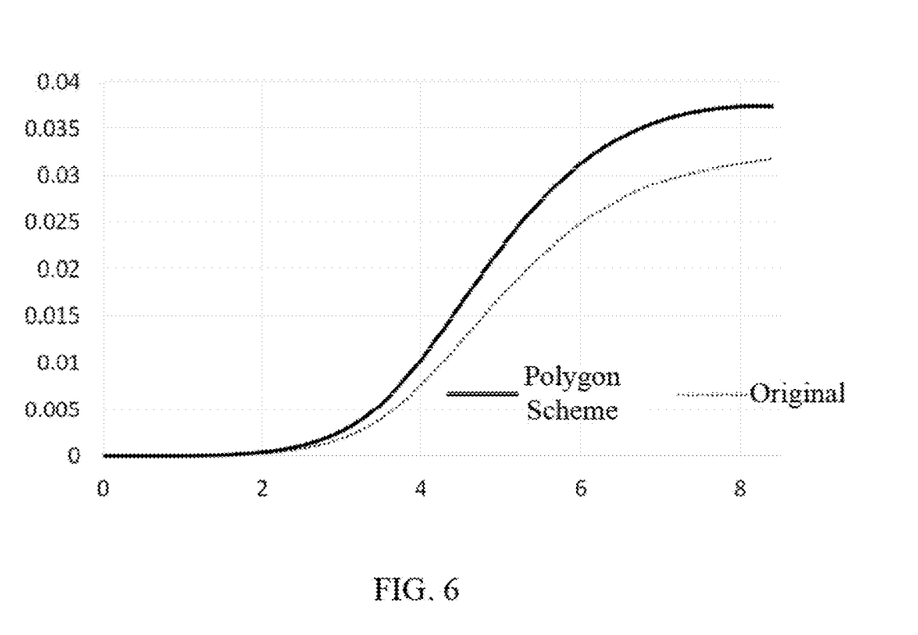
FIG. 6 is a schematic diagram of a variation curve of a voltage and a penetration rate of the fourth embodiment of the present application where the branch end is polygonal.
Figure 7:
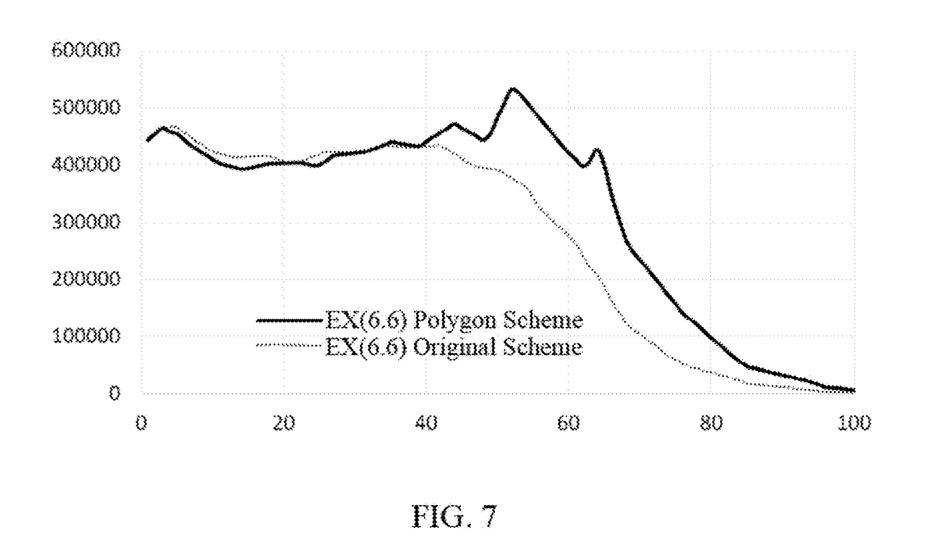
FIG. 7 is a schematic diagram of a variation curve of a horizontal electric field of the fourth embodiment of the present application where the branch end is a polygon.

The parameters of various positions of the end are defined, so that the electric field at the end of the branch changes, so as to improve the transmittance (Tr) of the pixel at the end position under the same voltage and the horizontal electric field intensity component in the liquid crystal cell, so as to improve the rotational efficiency of the liquid crystal at the edge position, and the influence of the data line and the scan line is simulated to obtain the V-T curve of the scheme where the branch end is polygonal and the original design scheme, as shown in FIG. 6. In the case of V=6.6 v, Tr is increased by 23.3%. The change of the fringe electric field Ex is shown in FIG. 7. The maximum horizontal electric field Ex of the polygon scheme is 13.74% higher than that of the original design scheme. It can be seen that the polygon scheme can improve the Tr of the edge position while reducing the possibility of Trace Mura.

Figure 8:
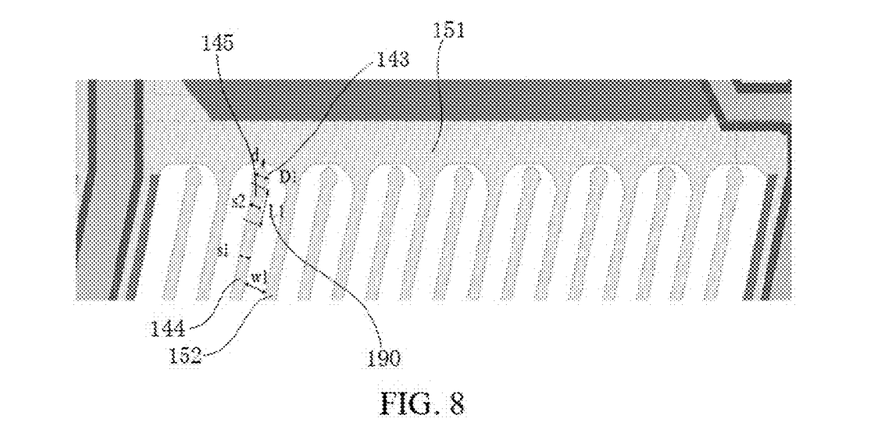
FIG. 8 is a schematic diagram of the fourth embodiment of the present application where the branch end is arc-shaped.

Referring to FIG. 8, the difference from the above-mentioned polygon example is that the branch end 143 is arc-shaped, and the diameter of the circle of the arc-shaped structure is D1, $3 \text{ um} \leq D1 \leq 4 \text{ um}$, and in some embodiments the value is 3.8 um. The junction of the common electrode trunk 151 and the common electrode branch 152 is an arc-shaped chamfer, where the arc-shaped chamfer and the arc-shaped edge of the common electrode trunk 151 adjacent to the branch end 143 form a circular arc structure. The end of the common electrode trunk 151 adjacent to the pixel electrode branch matches the shape of the branch end 143 of the pixel electrode branch.

Figure 9:
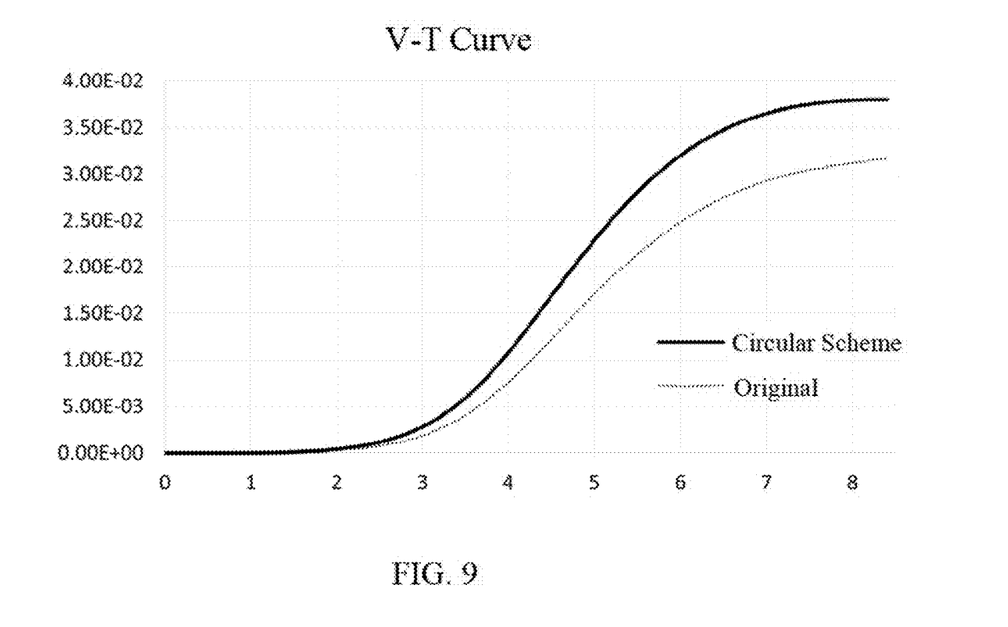
FIG. 9 is a schematic diagram of a variation curve of a voltage and a penetration rate in which the branch end is arc-shaped according to the fourth embodiment of the present application.
Figure 10:
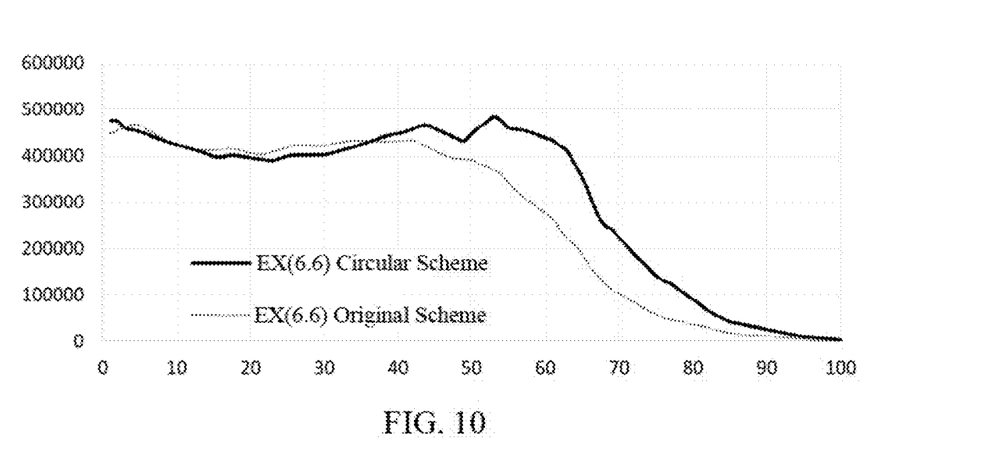
FIG. 10 is a schematic diagram of a variation curve of a horizontal electric field in which the branch end is arc-shaped according to the fourth embodiment of the present application.

FIG. 9 shows a V-T curve of the solution where the branch end is arc-shaped and that of the original design. In the case of V=6.6 v, Tr is increased by 26.16%. FIG. 10 shows the comparison of the horizontal electric fields Ex in the electric fields formed by the branch end and the common electrode trunk. The maximum horizontal electric field Ex of the circular scheme is increased by 3.44% compared with the original design scheme. It can be seen that the circular scheme can improve the Tr at the edge position while reducing the possibility of Trace Mura.

Figure 11:
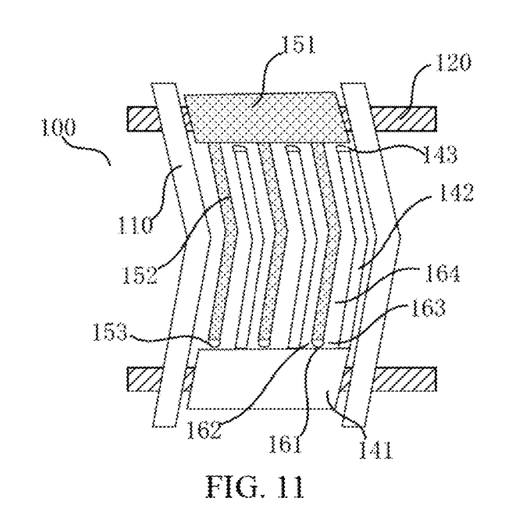
FIG. 11 is a schematic diagram of an array substrate of a fifth embodiment of the present application.

FIG. 11 is a schematic diagram of an array substrate of a fifth embodiment of the present application. As the fifth embodiment of the present application, on the basis of any of the above embodiments, or as an independent embodiment, the other end of the pixel and the corresponding pixel edge can also be changed. The other end of the pixel is opposite to the one end of the pixel in the above embodiments. The common electrode branch 152 is finger-shaped. The pixel electrode branches 142 and the pixel electrode trunk 141 form a glove shape. The pixel electrode layer further includes a pixel electrode trunk 141, and the plurality of the pixel electrode branches 142 are connected to the pixel electrode trunk 141. The common electrode branch 152 includes a common electrode branch body and a common electrode branch end 153 connected to the common electrode branch body. The common electrode branch end 153 is disposed at one end of the common electrode branch body adjacent to the respective pixel electrode trunk 141. The first gap 161, the second gap 162 and the third gap 163 are formed from the common electrode branch end 153 to the pixel electrode trunk 141 and the corresponding pixel electrode branches 142. The common electrode branch body and the corresponding pixel electrode branch 142 form the fourth gap 164. By changing the shape of the common electrode branch end 153, the width of the first gap 161 is further reduced, which is equivalent to reducing the gap between the common electrode end and the pixel electrode, which is beneficial to reduce the proportion of the vertical electric field influence range.

This embodiment is equivalent to: not only changing the shape of the finger-shaped branch end 143 in one pixel to shorten the gap from the branch end 143 to the common electrode trunk or the common electrode branch, thereby increasing the electric field strength from the branch end 143 to the common electrode trunk 151 or the common electrode branch 152; but also changing the shape of the finger-shaped common electrode branch end 153 in the pixel to shorten the gap between the common electrode branch end 153 and the pixel electrode trunk 141, thereby increasing the electric field strength between the common electrode branch end 163 and the common electrode trunk 151, reducing the possibility of occurrence of Trace Mura at the pixel edge, and improving the penetration rate at the edge. Of course, for each pixel, only the shape of the finger-shaped branch end may be changed.

The first gap 161, the second gap 162 and the third gap 164 formed from the common electrode branch end 153 to the pixel electrode trunk 141 or the pixel electrode branch 142, and the fourth gap 164 formed by the common electrode branch 152 and the pixel electrode branch 142 all meet the limitations of the width of the corresponding gap in any of the above embodiments.

Figure 12:
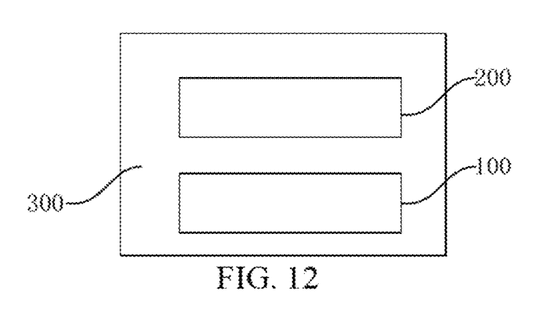
FIG. 12 is a schematic diagram of a display panel according to a sixth embodiment of the present application.

FIG. 12 is a schematic diagram of a display panel of a sixth embodiment of the present application. As the sixth embodiment of the present application, the present application further discloses a display panel 300, which includes a color filter substrate 200 and the array substrate 100 described in any of the above embodiments, and the array substrate 100 obtained by combining any one of the embodiments with multiple embodiments. The color filter substrate 200 is aligned and bonded with the array substrate 100.

Finally, it should be noted that the above embodiments are merely used to illustrate the technical solutions of the present disclosure, but not to limit them; although the present disclosure has been described in detail with reference to the foregoing embodiments, those of ordinary skill in the art should understand that the technical solutions described in the foregoing embodiments can still be modified, or some or all of the technical features thereof can be equivalently replaced; and these modifications or replacements do not make the essence of the corresponding technical solutions deviate from the scope of the technical solutions of the embodiments of the present disclosure.

What is claimed is:

1. An array substrate of an in-plane switching (IPS) mode display panel, the IPS display panel comprising a liquid crystal layer containing horizontally arranged liquid crystal molecules, the array substrate comprising a plurality of data lines, a plurality of scan lines, and a plurality of pixels, wherein the plurality of pixels are respectively driven by the corresponding scan lines and data lines, and wherein each of the plurality of pixels comprises a pixel electrode layer and a common electrode layer;

wherein the common electrode layer comprises a plurality of common electrode branches and a common electrode trunk connected to the plurality of common electrode branches; the pixel electrode layer comprises a plurality of interconnected pixel electrode branches;

wherein the plurality of pixel electrode branches are alternately arranged with the plurality of common electrode branches;

wherein each pixel electrode branch comprises a branch body and a branch end connected to the branch body, wherein the branch end is disposed at an end of the branch body adjacent to the common electrode trunk;

wherein the branch end comprises a first side, a second side and a third side, wherein the first side is disposed opposite the common electrode trunk to form a first gap, and wherein the second side and the third side are respectively disposed opposite to the common electrode branches on both sides of the pixel electrode branch to form a second gap and a third gap, respectively; a fourth gap is formed between the branch body and the common electrode branch on each side of the pixel electrode branch;

wherein of the first gap, the second gap and the third gap, a width value of at least one gap is smaller than a width of the fourth gap, so that a strength of an electric field between the branch end and the common electrode trunk is increased and that a ratio of an influence of the respective scan line and the respective data line to a horizontal electric field component of the electric field formed between the branch end and the common electrode trunk is reduced;

wherein a width of the first gap is smaller than the width of the fourth gap; wherein let the width of the first gap be d1, and the width of the fourth gap be w, then a ratio of d1 to w lies between 0.25 and 0.65, that is, $0.25 \leq d1/w \leq 0.65$.

2. The array substrate of claim 1, wherein the widths of the second gap and the third gap are equal, and the width of the second gap is smaller than the width of the fourth gap;

wherein let the width of the second gap and the third gap be d, then a ratio of d to w lies between 0.25 and 0.65, that is, $0.25 \leq d/w \leq 0.65$.

3. The array substrate of claim 1, wherein a first transition gap is formed from a junction of the common electrode trunk and each common electrode branch to the end of the respective pixel electrode branch adjacent to the common electrode trunk, wherein let the width of the first transition gap be X1, then $w > X1 > d1$.

4. The array substrate of claim 1, wherein each branch body comprises a first sub-branch and a second sub-branch, wherein the first sub-branch is connected to the respective branch end through the second sub-branch, wherein the fourth gap is formed between the first sub-branch and the respective common electrode branch, and a second transition gap is formed between the second sub-branch and the common electrode branch;

wherein let the width of the second transition gap be X2, where $d1 \leq X2 < w$;

wherein a value range of the width of the first gap is 1 um to 2.5 um, that is, $1 \text{ um} \leq d1 \leq 2.5 \text{ um}$;

and wherein a value range of the width of the fourth gap is 3.8 um to 4 um, that is, $3.8 \text{ um} \leq w \leq 4 \text{ um}$.

5. The array substrate of claim 4, wherein let a width of the first sub-branch be s1, a width of the second sub-branch be s2, a width of the respective branch end be w1, a length of the branch end be L1, and a length of the second sub-branch be L2;

then $1.8 \text{ um} \leq s1 \leq 2 \text{ um}$, $2 \text{ um} \leq s2 \leq 2.5 \text{ um}$, $2.5 \text{ um} \leq w1 \leq 3.5 \text{ um}$, $2.5 \text{ um} \leq L1 \leq 4 \text{ um}$, $4 \text{ um} \leq L2 \leq 8 \text{ um}$.

6. The array substrate of claim 1, wherein each branch end is a polygon, and wherein the junction of the common electrode trunk and each common electrode branch is an arc-shaped chamfer.

7. The array substrate of claim 1, wherein each branch end is arc-shaped, the junction of the common electrode trunk and each common electrode branch is an arc-shaped chamfer, and wherein the arc-shaped chamfer and an arc-shaped edge of the common electrode trunk adjacent to the respective branch end form an arc-shaped structure.

8. The array substrate of claim 1, wherein the pixel electrode layer further comprises a pixel electrode trunk, and wherein the plurality of pixel electrode branches are connected to the pixel electrode trunk; wherein each common electrode branch comprises a common electrode branch body and a common electrode branch end connected to the common electrode branch body; wherein the common electrode branch end is arranged at an end of the common electrode branch body adjacent to the respective pixel electrode trunk, wherein the pixel electrode trunk is arranged along a direction of the plurality of scan lines, and wherein the plurality of pixel electrode branches are arranged along a direction of the plurality of data lines, and wherein a width of a gap formed between the common electrode branch end and the respective the pixel electrode trunk and a width of a gap formed between the common electrode branch end and each adjacent pixel electrode branch is less than a width of a gap formed between the common electrode branch body and each adjacent pixel electrode branch.

9. The array substrate of claim 1, wherein widths of the second gap, the third gap, and the fourth gap are equal.

10. The array substrate of claim 1, wherein the widths of the second gap and the third gap are not equal, and wherein the width of at least one of the second gap and the third gap is less than the width of the fourth gap.

11. The array substrate of claim 1, wherein the common electrode trunk is arranged along a direction of the plurality of scan lines, and wherein the plurality of common electrode branch are arranged along a direction of the plurality of data lines.

12. The array substrate of claim 6, wherein a distance from each edge of the branch end to a corresponding edge of a nearest common electrode branch is equal.

13. The array substrate of claim 3, wherein the branch body comprises a first sub-branch and a second sub-branch, wherein the first sub-branch is connected to the branch end through the second sub-branch; wherein the fourth gap is formed between the first sub-branch and the common electrode branch, and a second transition gap is formed between the second sub-branch and the respective common electrode branch;
wherein let the width of the second transition gap be X2, then $d1 \leq X2 < w$;
wherein a value range of the width of the first gap lies in 1 um to 2.5 um, namely $1\ um \leq d1 \leq 2.5\ um$;
wherein a value range of the width of the fourth gap lies in 3.8 um to 4 um, namely $3.8\ um \leq w \leq 4\ um$;
wherein let the width of the first sub-branch be s1, the width of the second sub-branch be s2, the width of the branch end be w1, the length of the branch end be L1, and the length of the second sub-branch be L2, then $1.8\ um \leq s1 \leq 2\ um$, $2\ um \leq s2 \leq 2.5\ um$, $2.5\ um \leq w1 \leq 3.5\ um$, $2.5\ um \leq L1 \leq 4\ um$, $4\ um \leq L2 \leq 8\ um$.

14. The array substrate of claim 1, wherein widths of the first gap, the second gap, and the third gap are equal.

15. The array substrate of claim 8, wherein at one end of the pixel, the plurality of pixel electrode branches are finger-shaped, and wherein the plurality of common electrode branches and the common electrode trunk form a glove shape; wherein at the other end of the pixel, the plurality of common electrode branches are finger-shaped, and wherein the plurality of pixel electrode branches and the pixel electrode trunk form a glove shape.

16. A display panel of an in-plane switching (IPS) mode, comprising a color filter substrate and an array substrate, and further comprising a liquid crystal layer arranged between the color filter substrate and the array substrate and containing horizontally arranged liquid crystal molecules, wherein the color filter substrate and the array substrate are aligned and bonded together, wherein the array substrate comprises a plurality of data lines, a plurality of scan lines, and a plurality of pixels, wherein the plurality of pixels are respectively driven by the corresponding scan lines and data lines, and wherein each of the plurality of pixels comprises a pixel electrode layer and a common electrode layer;
wherein the common electrode layer comprises a plurality of common electrode branches and a common electrode trunk connected to the plurality of common electrode branches; the pixel electrode layer comprises a plurality of interconnected pixel electrode branches;
wherein the plurality of pixel electrode branches are alternately arranged with the plurality of common electrode branches;
wherein each pixel electrode branch comprises a branch body and a branch end connected to the branch body, wherein the branch end is disposed at an end of the branch body adjacent to the common electrode trunk;
wherein the branch end comprises a first side, a second side and a third side, wherein the first side is disposed opposite the common electrode trunk to form a first gap, and wherein the second side and the third side are respectively disposed opposite to the common electrode branches on both sides of the pixel electrode branch to form a second gap and a third gap, respectively; a fourth gap is formed between the branch body and the common electrode branch on each side of the pixel electrode branch;
wherein of the first gap, the second gap and the third gap, a width value of at least one gap is smaller than a width of the fourth gap, so that a strength of an electric field between the branch end and the common electrode trunk is increased and that a ratio of an influence of the respective scan line and the respective data line to a horizontal electric field component of the electric field formed between the branch end and the common electrode trunk is reduced;
wherein a width of the first gap is smaller than the width of the fourth gap; wherein let the width of the first gap be d1, and the width of the fourth gap be w, then a ratio of d1 to w lies between 0.25 and 0.65, that is, $0.25 \leq d1/w \leq 0.65$.

17. The display panel of claim 16, wherein the widths of the first gap, the second gap, and the third gap are each smaller than the width of the fourth gap;
wherein the widths of the first gap, the second gap and the third gap are equal;
wherein a first transition gap is formed from a junction of the common electrode trunk and each common electrode branch to the end of the respective pixel electrode branch adjacent to the common electrode trunk, wherein let the width of the first transition gap be X1, then $w > X1 \geq d1$;
wherein the branch body comprises a first sub-branch and a second sub-branch, wherein the first sub-branch is connected to the branch end through the second sub-branch; wherein the fourth gap is formed between the first sub-branch and the common electrode branch, and a second transition gap is formed between the second sub-branch and the respective common electrode branch;
wherein let the width of the second transition gap be X2, then $d1 \leq X2 < w$;
wherein a value range of the width of the first gap lies in 1 um to 2.5 um, namely $1\ um \leq d1 \leq 2.5\ um$;
wherein a value range of the width of the fourth gap lies in 3.8 um to 4 um, namely $3.8\ um \leq w \leq 4\ um$;
wherein let the width of the first sub-branch be s1, the width of the second sub-branch be s2, the width of the branch end be w1, the length of the branch end be L1, and the length of the second sub-branch be L2, then $1.8\ um \leq s1 \leq 2\ um$, $2\ um \leq s2 \leq 2.5\ um$, $2.5\ um \leq w1 \leq 3.5\ um$, $2.5\ um \leq L1 \leq 4\ um$, $4\ um \leq L2 \leq 8\ um$.

18. The display panel of claim 17, wherein the pixel electrode layer further comprises a pixel electrode trunk, and wherein the plurality of pixel electrode branches are connected to the pixel electrode trunk; wherein each common electrode branch comprises a common electrode branch body and a common electrode branch end connected to the common electrode branch body; wherein the common electrode branch end is arranged at an end of the common electrode branch body adjacent to the respective pixel electrode trunk, wherein the pixel electrode trunk is arranged along a direction of the plurality of scan lines, and wherein the plurality of pixel electrode branches are arranged along a direction of the plurality of data lines, and wherein a width of a gap formed between the common electrode branch end and the respective the pixel electrode trunk and a width of a gap formed between the common electrode branch end and each adjacent pixel electrode branch is less than a width of a gap formed between the common electrode branch body and each adjacent pixel electrode branch;

wherein at one end of the pixel, the plurality of pixel electrode branches are finger-shaped, and wherein the plurality of common electrode branches and the common electrode trunk form a glove shape; wherein at the other end of the pixel, the plurality of common electrode branches are finger-shaped, and wherein the plurality of pixel electrode branches and the pixel electrode trunk form a glove shape.

* * * * *